(12) United States Patent
Hardy et al.

(10) Patent No.: US 11,128,543 B2
(45) Date of Patent: Sep. 21, 2021

(54) ENROLLMENT DATA VISUALIZATION USING ENHANCED GRAPHICAL USER INTERFACE ELEMENTS

(71) Applicant: VMware, Inc., Palo Alto, CA (US)

(72) Inventors: Adam Michael Hardy, Alpharetta, GA (US); Carlos Carbonell, Altanta, GA (US); Jason Bedient, Palo Alto, CA (US); Binjie Sun, Atlanta, GA (US); Qi Gao, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/211,768

(22) Filed: Dec. 6, 2018

(65) Prior Publication Data
US 2020/0186435 A1 Jun. 11, 2020

(51) Int. Cl.
*G06T 11/20* (2006.01)
*H04L 12/24* (2006.01)
*G06F 3/0484* (2013.01)

(52) U.S. Cl.
CPC .......... *H04L 41/22* (2013.01); *G06F 3/04847* (2013.01); *G06T 11/206* (2013.01); *G06T 2200/24* (2013.01)

(58) Field of Classification Search
CPC ............. G06T 11/206; G06F 11/30–36; G06F 11/0706–0712
See application file for complete search history.

(56) References Cited

U.S. PATENT DOCUMENTS

| | | | |
|---|---|---|---|
| 8,327,335 B2* | 12/2012 | Noble | G06F 11/32 702/119 |
| 2004/0064293 A1* | 4/2004 | Hamilton | G06F 11/3409 702/182 |
| 2009/0235267 A1* | 9/2009 | McKinney | G06F 11/328 718/104 |
| 2010/0122175 A1* | 5/2010 | Gupta | H04L 41/0893 715/735 |

(Continued)

OTHER PUBLICATIONS

Ryan Rowland, "Forecasting the 2016 Election," Oct. 2016, retrieved from https://public.tableau.com/en-us/gallery/forecasting-2016-election on Nov. 25, 2019. (Year: 2016).*

(Continued)

*Primary Examiner* — Ryan McCulley
(74) *Attorney, Agent, or Firm* — Thomas | Horstemeyer, LLP

(57) ABSTRACT

Various examples are described for enrollment data visualization using enhanced graphical user interface elements. In one example, a management service can receive device data from devices enrolled with the management service, where the management service is configured to remotely oversee operation of the devices. The management service can determine operational metrics using the device data describing operation of the client devices and generate a metric visualization region for display in a user interface. In some examples, the metric visualization region can include a graph plotting the operational metrics over a predefined period of time and a circle having a predefined width circumscribing the graph, where at least a portion of the circle is filled based on the operational metrics.

20 Claims, 5 Drawing Sheets

(56) References Cited

U.S. PATENT DOCUMENTS

2015/0248119 A1* 9/2015 Yamasaki .............. G05B 15/02
                                                      700/17
2018/0324057 A1* 11/2018 Agrawal ............. H04L 41/5009
2019/0129821 A1*  5/2019 Lee .................... G06F 11/3409

OTHER PUBLICATIONS

Sergio Ruiz, "Tableau: visualization of data in radial graphs," Mar. 2018, retrieved from https://www.analiticaweb.es/tableau-visualizacion-datos-graficos/on Nov. 25, 2019. (Year: 2018).*

"Rappid—shapes." Rappid, May 4, 2017, https://resources.jointjs.com/docs/rappid/v2.2/shapes.html. (Year: 2017).*

* cited by examiner

ENROLLMENT DATA VISUALIZATION USING ENHANCED GRAPHICAL USER INTERFACE ELEMENTS

BACKGROUND

Various operating systems offer mobile device management (MDM) capabilities that permit third-party applications to secure and oversee operation of a device. Unified endpoint management (UEM) solutions enable administrators of enterprises and other organizations to secure and oversee the operation of a multitude of various types of devices having various types of operating systems and MDM capabilities, such as smartphones, desktop computers, laptops, tablets, and peripheral devices.

Generally, UEM solutions include a management service hosted in a remote computing environment, where the management service permits administrators to secure and oversee operation of the multitude of devices through a single portal, referred to as an administrator console. Through the administrator console, administrators of the management service can review particular metrics for enrolled devices. For instance, administrators can determine the number of devices running legacy versions of operating systems. However, viewing data for enrolled devices remains problematic as the management service can oversee hundreds to thousands of devices, each having unique characteristics and configurations. As such, it remains problematic for administrators to identify devices or deployment issues that require attention.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to enrollment data visualization using enhanced graphical user interface elements. Administrators of an enterprise or other organization, which usually include information technology (IT) personnel, can utilize a management service to secure and oversee operation of devices enrolled with the management service. Through an administrator console, administrators can define actions or events to occur when predefined criteria has been met by one or more devices. For instance, if a state of a device indicates that the device is a security risk, the administrator can take remedial actions through the management service, such as removing the device from a network, requiring the device to perform a virus scan or other action that could alleviate the security risk.

It is beneficial for administrators to view metrics when determining various policies for the management service. For instance, before implementing a new policy that requires all devices to upgrade to a latest version of an application or an operating system, administrators may desire to know how many devices are currently running legacy versions of the operating system (as opposed to those that have already upgraded). The metrics can be beneficial in determining the number of devices that will be impacted as a result of the policy change as well as other issues that could occur, for instance, regarding the operation of frequently used features or applications. Additionally, administrators may desire to view the number of devices upgrading in real time.

As such, various examples of graphical user interfaces are described herein that facilitate the presentation of data pertaining to devices enrolled with a management service. In some examples, one or more computing devices can receive device data from client devices enrolled with a management service configured to remotely oversee operation of the client devices. The computing devices can generate operational metrics using the device data describing operation of the client devices. Thereafter, the computing devices can generate a metric visualization region for display in a user interface that improves the display of data for enrolled devices as compared to prior systems.

In some examples, the metric visualization region can include a graph plotting the operational metrics over a predefined period of time. Additionally, in some examples, a circle having a predefined width can circumscribe the graph, where at least a portion of the circle is filled or populated based on the operational metrics. The computing devices can generate a user interface that includes the metric visualization region for transmission to an administrator device for display, and the metric visualization region can be updated in real time.

Figure 1:
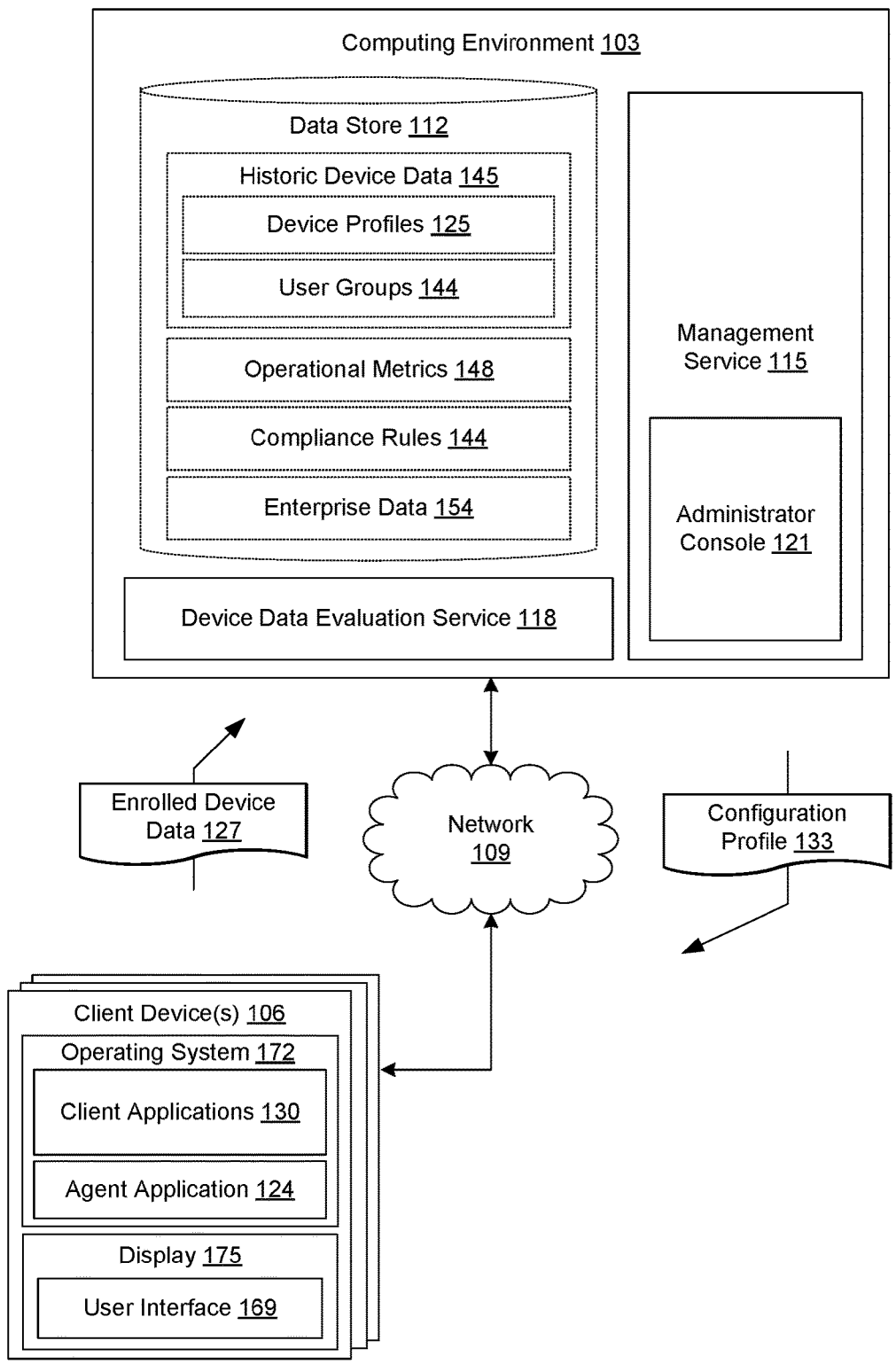
FIG. 1 is a drawing of a networked environment that includes a management service and an administrator console that provide enrollment data visualization using enhanced graphical user interface elements.

Turning now to FIG. 1, an example of a networked environment 100 is shown. The networked environment 100 can include a computing environment 103 and one or more client devices 106 in data communication with one other over a network. The network can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include one or more computing devices that are arranged, for example, in a server bank, computer bank, or other arrangement. The computing environment 103 can include a grid computing resource or any other distributed computing arrangement. The computing devices can be located in a single installation or can be distributed among many different geographical locations.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network, the computing environment 103 can be described as a remote computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115, a device data evaluation service 118, as well as other applications, services, processes, systems, engines, or functionality not discussed in detail herein. While the device data evaluation service 118 is shown separate from the management service 115, in some examples, the device data evaluation service 118 may include logic or other sub-component of the management service 115.

The management service 115 can be executed to oversee the operation of client devices 106, for instance, those enrolled or destined to be enrolled with the management service 115. In some examples, an organization, such as a company, enterprise, or other entity, can operate the management service 115 to oversee or manage the operation of the client devices 106 of its employees, contractors, customers, or other individuals having accounts with the enterprise. In some examples, various settings and tasks performed by the management service 115 can be defined by administrators of the management service 115. For example, if the management service 115 is employed for employees of an enterprise, the administrators can include IT personnel of the enterprise tasks with overseeing operation of the client devices 106 enrolled with the management service 115. As such, the management service 115 can provide an administrator console 121 that permits administrators to define policies and other criteria for a client device 106 to remain in compliance with the management service 115. Additionally, through the administrator console 121, the administrators can specify configurations of the client devices 106 that can be carried out through interaction with an agent application 124 on each of the client devices 106.

The device data evaluation service 118 can receive enrolled device data 127 collected by the agent application 124 (or other client application 130) on each of the client devices 106, and can generate metrics, graphics, or other information that can be useful in evaluating the configuration or performance of the client devices 106 enrolled with the management service 115. The enrolled device data 127 can include data describing a particular state or configuration of a client device 106, in some examples. For instance, an enrolled device data 127 for a client device 106 can include a listing of the client applications 130 installed on the client device 106, versions of the client applications 130 and associated settings, hardware settings, software settings, usage statistics, as well as other data.

In one example, the management service 115 interacts with the agent application 124 on a client device 106 to enroll the client device 106 with the management service 115. Enrollment can include authenticating the client device 106 using login information, such as an email address, username, or password, as well as device information or biometric information. The agent application 124 can include one of the client applications 130 that can be registered as a device administrator of the client device 106 through management application programming interfaces (APIs) of an operating system, which can provide the agent application 124 with sufficient privileges to control operation of various functions of the client device 106. Further, the agent application 124 can configure a client device 106 in accordance with data provided to the client device 106, referred to as a configuration profile 133. In some examples, the configuration profile 133 can include an extensible markup language (XML) document that causes the agent application 124 to configure the client device 106 in accordance with settings or other parameters specified in the XML document. Additionally, the configuration profile 133 can include specifications of particular data for the agent application 124 to collect.

The management service 115 or the agent application 124 can instruct the client device 106 to check-in with the management service 115 periodically, randomly, or based on a check-in schedule by sending enrolled device data 127 to the computing environment 103. In some examples, the enrolled device data 127 can include data pertaining to the configuration or operation of the client device 106. For instance, in some examples, the enrolled device data 127 can include a device profile that includes hardware or software settings of the client device 106. Hardware settings can include user-specified configurations and other data pertaining to a display 136, camera, speaker, touch screen display, global positioning system (GPS) or other geo-location hardware, or other hardware of the client device 106. Software settings can include user-specified configurations or other data pertaining to an operating system 172, client applications 130, or other software of the client device 106. For instance, software settings can include a list of installed client applications 130, as well as various user-specified configurations or settings of the installed client applications 130. The enrolled device data 127 can include an XML file, data structure, or other data object comprising data that can be sent over the network 109. Traditionally, the enrolled device data 127 collected by the agent application 124 can be evaluated by the management service 115 to determine whether a client device 106 is in compliance with one or more compliance rules 144 specified by the administrators.

The data stored in the data store 112 can include, for example, historic device data 145, operational metrics 148, compliance rules 144, enterprise data 154, as well as other data. Historic device data 145 can include data pertaining to a client device 106 enrolled or managed by the management service 115 stored in the data store 112. For instance, when a client device 106 checks in with the management service 115, the management service 115 can store the enrolled device data 127 (or other data received during the check-in) as historic device data 145. As such, the management service 115 can maintain historic device data 145 for client devices 106 enrolled with the management service 115, where the historic device data 145 describes past and most-recent configurations of the client devices 106.

Operational metrics 148 can include metrics derived from enrolled device data 127 that describe operation of the client devices 106 enrolled with the management service 115. In some examples, operational metrics 148 can be generated for a single one of the client devices 106. In other examples, operational metrics 148 can be generated for groups of client devices 106 enrolled with the management service 115. In some examples, operational metrics 148 can include a number of devices having a particular version or type of operating system installed thereon. In other examples, operational metrics 148 can include a number of devices having a particular client application installed thereon that requires a software license. In other examples, operational metrics 148 can include health scores describing an operation of one or more client devices 106, or an overall system health score describing operation of the management service 115 based on parameters specified by the administrators.

Compliance rules 144 can include criteria specified by administrators to secure or oversee operation of client devices 106 enrolled with the management service 115. For instance, administrators can specify criteria for a client device 106 to be in compliance with the management service 115. If a client devices 106 is not in compliance with the management service 115, the management service 115 can perform actions predefined by the administrators, such as denying access to enterprise data 154, reconfiguring a client device 106, notifying an operator of the client device 106, as well as other actions.

In various examples, the management service 115 can generate one or more user interfaces 169 having fields that obtain information regarding a desired configuration of client devices 106 enrolled (or to be enrolled) with the management service 115. Through these user interfaces 169, administrators can provide information regarding how the administrators desire the client devices 106 to operate. In one example, administrators can specify one or more client applications 130 to be installed on the client devices 106. In another example, the administrator can specify settings to be configured on the client devices 106, such as Wi-Fi network settings, VPN settings, email server settings, or other settings. In another example, the administrator can specify settings that cause the client device 106 to toggle between modes of operation, such as during work hours or when the client device 106 is in a particular geo-location.

Based on the settings specified by an administrator in the user interfaces 169, the management service 115 can generate a configuration profile 133 that is published for one or more client devices 106. When published, the agent application 124 on the client device 106 can identify the configuration profile 133 as being applicable to the client device 106 and, as a result, can download and configure the client device 106 in accordance with the settings set forth in the configuration profile 133. Further, the one or more user interfaces 169 can permit the administrator to specify compliance rules 144 as well as actions to be performed based on the compliance rules 144.

In some examples, the configuration profile 133 can direct the agent application 124 to configure hardware or software functionality of a client device 106 such that the client device 106 operates in conformance with the compliance rules 144 or other criteria specified in the configuration profile 133. Additionally, the management service 115 can identify when the client device 106 is not in conformance with the compliance rules 144 and can take appropriate remedial actions, such as denying access to enterprise data 154, enterprise applications, or performing other actions.

In some examples, the management service 115 communicates with the agent application 124 or other client application 130 executable on the client device 106 to determine whether vulnerabilities exist on the client device 106 that do not satisfy policies defined by an administrator. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications 130, or other vulnerability as can be appreciated.

The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, a peripheral device, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 172 configured to execute various client applications 130, such as the agent application 124, as well as other applications. Some client applications 130 can access enterprise data 154 and other network content served up by the computing environment 103 or other servers, thereby rendering a user interface 169 on a display 175, such as a liquid crystal display (LCD), touch-screen display, or other type of display device. To this end, some client applications 130 can include a browser or a dedicated application, and a user interface can include a network page, an application screen, or other interface. Further, other client applications 130 can include device management applications, enterprise applications, social networking applications, word processors, spreadsheet applications, media viewing applications, or other applications.

Figure 2:
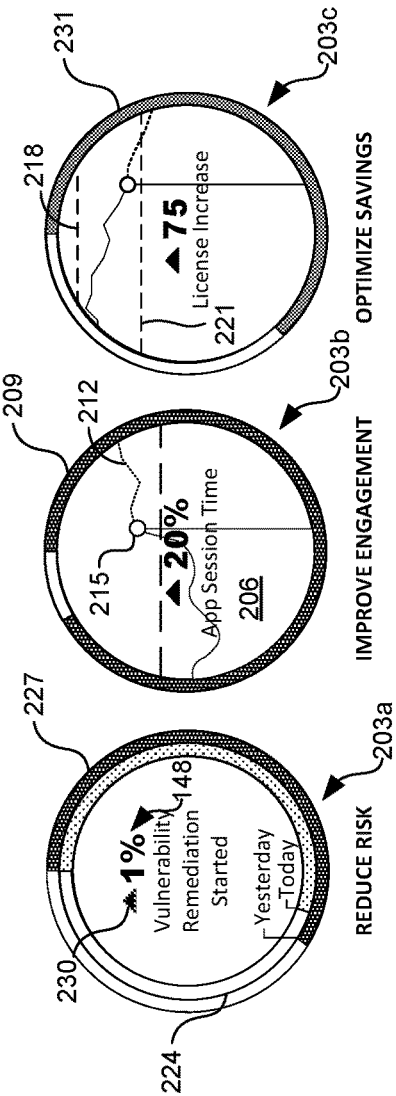
FIGS. 2-4 are example user interfaces that permit an administrator to view operational metrics generated for devices enrolled with the management service.

Referring next to FIG. 2, an example of a user interface 169 is shown. More specifically, the user interface 169 of FIG. 2 can include a portion of the administrator console 121 that permits an administrator to oversee operation and configuration of client devices 106 enrolled with the management service 115. Based on the configurations specified by an administrator in the administrator console 121, a configuration profile 133 can be generated and sent to client devices 106 for local configuration and enforcement, as can be appreciated.

Additionally, the user interface 169 can present data pertaining to the client devices 106 enrolled with the management service 115 such that the administrators can make informed decisions pertaining to overseeing and configuring the client devices 106. For instance, based on the data presented in the user interface 169, the administrators can determine whether to create new policies, modify existing policies, or perform remedial tasks. To assist with the presentation of data collected from the client devices 106, the management service 115 or the device data evaluation service 118 can generate operational metrics 148 using the enrolled device data 127 that describes operation of the client devices 106.

In one example, one of the operational metrics 148 can include an average session time of a particular one of the client applications 130 executing on the client devices 106. For instance, it may be a policy of an enterprise to drive use of a particular client application 130, such as a customer relations management (CRM) platform or a secure email application. In the user interface 169 of FIG. 2, one of the operational metrics 148 can include a change in an average session time of a particular one of the client applications 130 over time. As can be appreciated, the administrator can quickly identify whether a client application 130 is being used on the client devices 106, and can modify policies as needed.

In another example, one of the operational metrics 148 can include a number of licenses, such as software licenses, actively used (or unused) by the client devices 106. As a result, an administrator can determine whether to purchase or allocate additional licenses. To this end, the administrator console 121 can assist with saving costs incurred by an organization by ensuring an efficient allocation of software licenses. In the user interface 169 of FIG. 2, an operational metric 148 is shown as a change in a number of licenses for a particular one of the client applications 130 over time.

The regions of the user interface 169 that include the one or more operational metrics 148, or data associated therewith, can be referred to as metric visualization regions 203a . . . 203c (collectively "metric visualization regions 203"). As shown in FIG. 2, the metric visualization regions 203 can include various visual indicators that facilitate review regarding any notable changes to the client devices 106 enrolled with the management service 115, which may require attention of the administrators.

Referring first to the second one of the metric visualization regions 203b, the metric visualization region 203b can include a graph 206 plotting operational metrics 148 for a client device 106 (or group of client devices 106) over a predefined period of time. The metric visualization region 203b can further include a circle 209 having a predefined width circumscribing the graph 206, wherein at least a portion of the circle 209 is "filled" or populated based on an operational metric 148 or a change in the operational metric 148 associated therewith. The circle 209, or portion thereof, being filled or populated can include a region being assigned a predefined color, texture, shade, or pattern, as illustrated in the example of FIG. 2.

The one or more of the metric visualization regions 203 can be used to present various information regarding client devices 106 enrolled with the management service 115. For instance, the first metric visualization region 203a can display a percentage of the client devices 106 in which a vulnerability remediation has been started (labeled "vulnerability remediation started"). For instance, the management service 115 can identify various vulnerabilities on a client device 106. If a vulnerability is identified on the client device 106, the management service 115 can perform a remediation to remove the vulnerability on the client devices 106. In one example, the management service 115 can identify that a version of an anti-virus application installed on a client device 106 is out-of-date. A remediation of the vulnerability can include the management service 115 directing the client device 106 to update the anti-virus application to a latest version. Other vulnerabilities can include the presence of unauthorized client applications 130 or other data, the detection of a virus or malware, or the detection of a client device 106 being "jailbroken" or "rooted." As such, the first metric visualization region 203a can be used to determine whether past efforts for identifying and remedying security vulnerabilities have been effective in reducing risk, or to determine whether additional efforts are needed to reduce security vulnerabilities or other risks to an organization or enterprise.

The second one of the metric visualization regions 203b can facilitate forecasting actions that may need to be performed in the near future. To this end, the management service 115 or the device data evaluation service 118 can forecast operational metrics 148 (or "forecasted metrics") for a future period of time. In some examples, the forecasted ones of the operational metrics 148 can be determined based on past operational metrics 148. The metric visualization region 203b thus can include a line plot 212 or other display of the forecasted operational metrics 148. The line plot 212 is shown as a continuation of the graph 206, as can be appreciated. In some examples, the line plot 212 can include a trend line or similar graphical feature. The metric visualization region 203b also can include a visual indicator 215, such as a graphic or an icon, illustrating an operational metric 148 corresponding to a current or present period in time.

Specifically, the second one of the metric visualization regions 203b is shown displaying an increase of 20% in an average session time (or usage time) for a client application 130 that provides an administrator with a degree of user engagement with the client application 130. Based on the increase in the average session time, the forecasted portion of the line plot 212 is shown trending upwards although it is understand that the forecasted portion could trend downwards as well. As can be appreciated, the second metric visualization region 203b can be used to quickly determine whether past efforts have been effective in improving application engagement, or to determine whether additional attention or effort should be made to improve application engagement. For example, the management service 115 can attempt to improve engagement with a client application 130 by sending push notifications, emails, simple messaging service (SMS) messages, or other notifications to one or more client devices 160 that may encourage a user to open or otherwise engage with the client application 130.

Referring next to the third one of the metric visualization regions 203c, in combination with or in place of the aforementioned, the metric visualization region 203c can include an upper bound 218 and/or a lower bound 221. In some examples, the upper bound 218 and the lower bound 221 can be determined based on the operational metrics 148. The upper bound 218 can include a line or other visual indicator that, for a set of operational metrics 148, is larger than every operational metric 148 in the set. Similarly, the lower bound 218 can include a line or other visual indicator that, for a set of operational metrics 148, is less than every operational metric 148 in the set.

The third metric visualization region 203c of FIG. 2 is shown displaying an increase in a number of licenses required, for instance, due to new installations of a client application 130 or use of other services that require a license. As such, the third metric visualization region 203c can be used to quickly determine whether licensing costs are increasing or decreasing based on use of the client devices 106. The upper bound 218 can include a historical maximum number of licenses while the lower bound 221 can include a historical minimum number of licenses. Additionally, the third metric visualization region 203c can be used to determine whether various events, such as employee hires or departures at an enterprise or other organization, have increased or decreased licensing costs. Further, the management service 115 can attempt to reduce or otherwise optimize savings by identifying client devices 106 that may not require licenses for a particular client application 130, for instance, based on a lack of use of the client application 130 or a lack of use of a client device 106 itself.

Referring to the first one of the metric visualization regions 203a, the metric visualization region 203a has a first circle 224 and a second circle 227. As shown in FIG. 2, the second circle 227 can circumscribe the first circle 224 and be directly adjacent to the first circle 224 in some examples. The first circle 224 and the second circle 227 can have substantially similar widths in some examples, or can have varying widths. Additionally, the first circle 224 and the second circle 227 can circumscribe a graph 206 in some examples. In other words, the graph 206 can be wholly positioned within the first circle 224 and/or the second circle 227. As can be appreciated, the first circle 224 can be associated with a first set or a first type of the operational metrics 148 while the second circle 227 can be associated with a second set or a second type of the operational metrics 148.

As shown in FIG. 2, the first circle 224 represents a set of operational metrics 148 for a first period of time ("Today") while the second circle 227 represents a set of operational metrics 148 for a second period of time ("Yesterday"). For example, the first circle 224 can represent an entirety of the client devices 106 enrolled with the management service 115 and a shaded portion of the first circle 224, shown in a first color, can represent a percentage of the client devices 106 on which a security vulnerability has been identified yesterday. Similarly, the second circle 227 can represent an entirety of the client devices 106 enrolled with the management service 115, whereas the shaded portion of the second circle 227, shown in a second color, can represent a percentage of the client devices 106 on which a security vulnerability has been identified today. As the operational metric 148 encapsulated within the first circle 224 and the second circle 227 displays a 1% increase in the number of vulnerability remediations started, a comparison of the shaded portion of the first circle 224 and the second circle 227 shows a reduction in device vulnerabilities between yesterday and today.

In the interior of the first circle 224 and the second circle 227, an arrow 230 can indicate whether an operational metric 148 or a change in the operational metric 148 is an increase or a decrease from historical device data 145. For instance, an upward direction or downward direction of the arrow 230 can indicate whether the change is positive or negative, respectively. In the example of FIG. 2, the up arrow indicates an increase in 1% a number of vulnerability remediations started. Additionally, the user interface 169 can include the operational metric 148, or the change in the operational metrics 148, shown near the arrow 230.

Further, the circle 209 of the second one of the metric visualization regions 203b and a circle 231 of the third one of the metric visualization regions 203c are shown partially shaded. As the second one of the metric visualization regions 203b corresponds to operational metrics 148 describing application session times, the circle 209 can represent an entirety of the client devices 106 on which a particular client application 130 is installed. The shaded portion of the circle 209, shown in a color differing from the non-shaded portion of the circle 209, can represent a percentage of the client devices 106 that have recorded increased session times with a particular client application 130.

As the third one of the metric visualization regions 203c corresponds to operational metrics 148 describing an increase in a number of licenses obtained, a shaded portion of the circle 231 can represent a percentage of the client devices 106 enrolled with the management 115 that require a license. As such, an administrator can quickly determine a percentage of the client devices 106 that require a license or a particular type of license.

In some examples, the user interface 169 can include a system health score 233. The management service 115 or the device data evaluation service 118 can generate the system health score 233 as a function of the operational metrics 148 determined for various parameters of the client devices 106. In some examples, the system health score 233 can be generated as a function of a multitude of factors, such as a number of client devices 106 having a security vulnerability, application or service user engagement, a number of licenses obtained for client devices 106 that require licenses based on software usage, as well as other information. In other words, the management service 115 can generate an operational metric 148 describing the number of client devices 106 having a security vulnerability, an operational metric 148 describing application or service user engagement, an operational metric 148 describing a number of licenses obtained for client devices 106 that require licenses based on software usage, as well as other factors. The system health score 233 can include a weighted summation of the factors in some examples.

Additionally, based on the system health score 233 or the operational metrics 148, insights 236 can be determined and displayed. The insights 236 can include recommendations for an administrator to implement to improve one or more of the operational metrics 148. Additionally, insights 236 can include an option to automate a function that will improve the operational metrics 148. In some examples, the insights 236 can include predefined actions stored in the data store 112 associated with one of the factors. For instance, remedial actions can be stored in associated with a factor, such as security risk, that, if performed, would decrease the security risk and improve overall operation of the management service 115.

Figure 3:
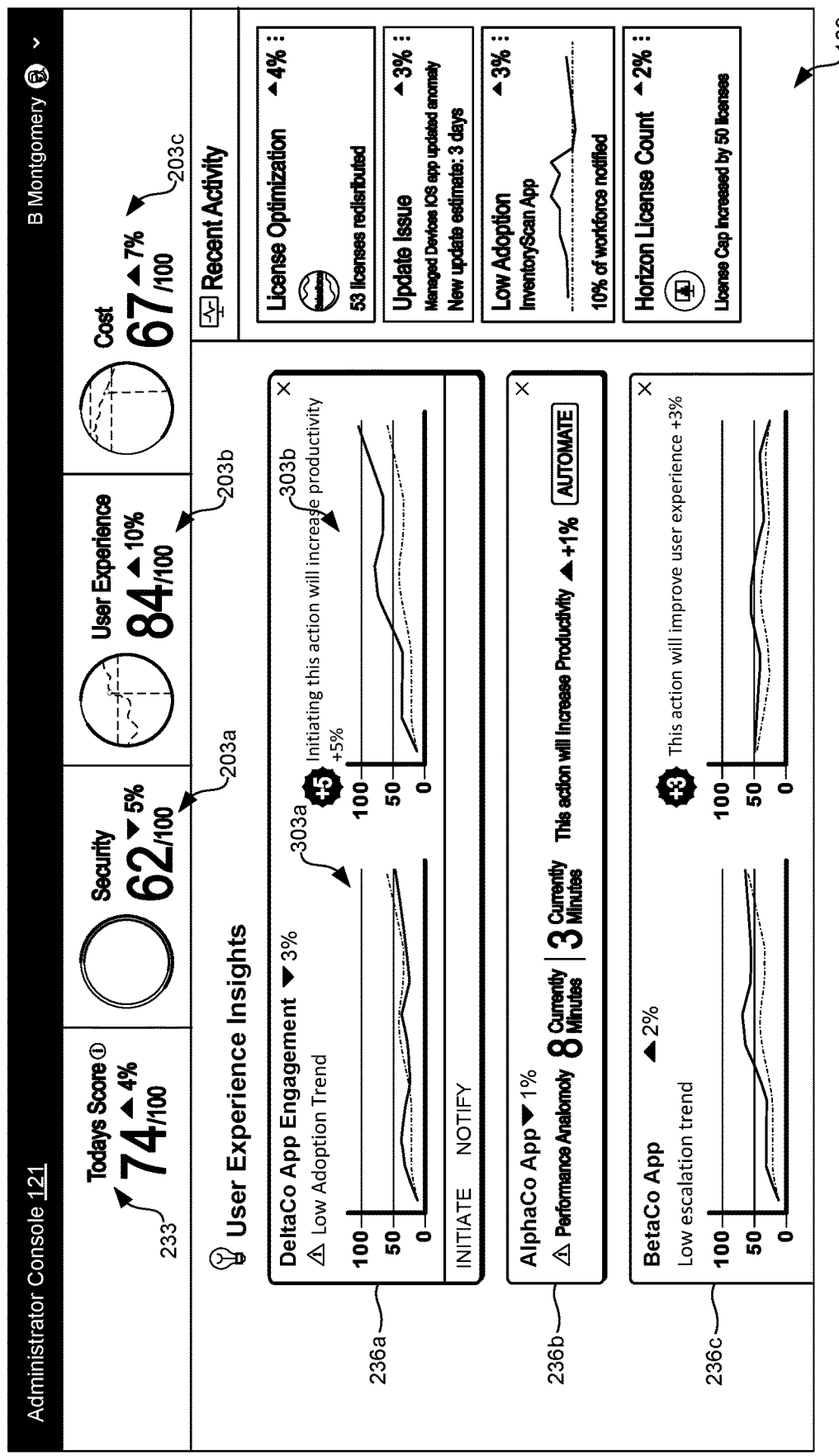

Turning now to FIG. 3, another example of a user interface 169 of the administrator console 121 is shown. Similar to FIG. 2, the user interface 169 of FIG. 3 can present data pertaining to the client devices 106 enrolled with the management service 115 such that the administrators can make informed decisions when specifying policies and configurations for the client devices 106. The user interface 169 of FIG. 3 shows three metric visualization regions 203a . . . 203c (collectively "metric visualization regions 203"), although the user interface 169 can include other amounts of metric visualization regions 203 that provide a quick and efficient review regarding any notable changes to the client devices 106 enrolled with the management service 115, such as those that may require the attention of an administrator.

In the example of FIG. 3, the user interface 169 can include a first metric visualization region 203a for device security, a second metric visualization region 203b for user experience, and a third metric visualization region 203c associated with operational costs, although other metric visualization regions 203 can be shown for other types of operational metrics 148. The metric visualization regions 203 can be shown in association with a system health score 233 in some examples.

Similar to FIG. 2, the metric visualization regions 203 can include a graph 206 having operational metrics 148 plotted for a client device 106 or group of client devices 106 over a predefined period of time. Additionally, the metric visualization region 203b can further include a circle 209 (or a first circle 224 and a second circle 227) having a predefined width circumscribing the graph 206, wherein at least a portion of the circle 209 is filled or populated based on an operational metric 148 or a change in the operational metric 148 associated therewith.

Additionally, the metric visualization regions 203 provide visual indicators for forecasted metrics that allow administrators to easily determine trends occurring related to client devices 106 enrolled with the management service 115. For instance, the management service 115 or the device data evaluation service 118 can generate forecasted operational metrics 148 for a period of time in the future based on current or historical trends. The metric visualization regions 203 can further include an upper bound 218 and/or a lower bound 221 determined based on the operational metrics 148.

In or near the metric visualization regions 203, the user interface 169 can include an arrow 230 indicating whether an operational metric 148 or a change in the operational metric 148 includes an increase or a decrease from historical device data 145. For instance, an upward direction or downward direction of the arrow 230 can indicate whether the change is positive or negative, respectively. The user interface 169 can include the operational metric 148, or the change in the operational metrics 148, shown near the arrow 230.

After generating various operational metrics 148, the management service 115 can identify various insights 236 regarding the client devices 106 enrolled with the management service 115. For instance, the administrator console 121 can present insights 236a . . . 236c regarding user experience interactions on the client device 106. The first insight 236a indicated that a client application 130 ("DeltaCo App") installed on the client device 106 has a decrease in engagement indicative of a low adoption among users. A first chart 303a indicates a current adoption trend, while a second chart 303b indicates a forecasted adoption trend assuming the administrator performs a particular function.

Figure 4:
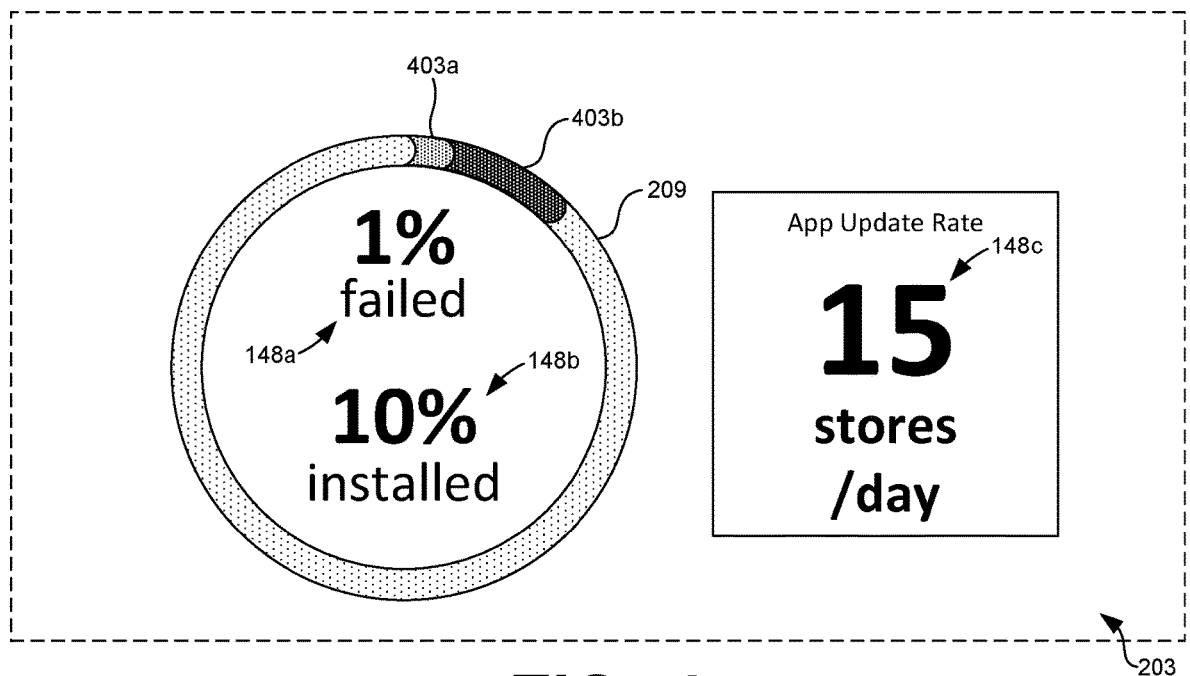

Turning now to FIG. 4, another example of a metric visualization region 203 is shown that can be included in a user interface 169 or an administrator console 121. The metric visualization region 203 can include a circle 209 having a predefined width circumscribing a first operational metric 148a and a second operational metric 148b. The circle 209 may include regions 403a, 403b having a size determined based on corresponding operational metrics 148a, 148b. For instance, the first one of the regions 403a can correspond to the first operational metric 148a while the second one of the regions 403b can correspond to the second operational metrics 148b.

As shown in FIG. 4, the metric visualization region 203 can be used to display a number of updates of a client application 130 being performed, where the metric visualization region 203 can be updated live or in real time as a user interface 169 is shown. The first operational metric 148a indicates that 1% of the client devices 106 attempting an upgrade have had an installation failure ("1% failed") while the second operation metric 148b indicates that 10% of the client devices 106 have successfully installed the client application 130 ("10% installed"). A third operational metric 148c provides an application update rate of fifteen of the client devices 106 per day. The first region 403a of the circle 209 is filled to correspond to the 1% failure rate, while the second region 403b of the circle 209 is filled to correspond to the 10% successful installation rate. As can be appreciated, the first region 403a and the second region 403b can be updated over time to increase or decrease as applicable. In some examples, the first region 403a can include a color or pattern matching that of the first operational metric 148a while the second region 403b can include a color or pattern matching that of the second operational metric 148b to facilitate quick inspection.

Figure 5:
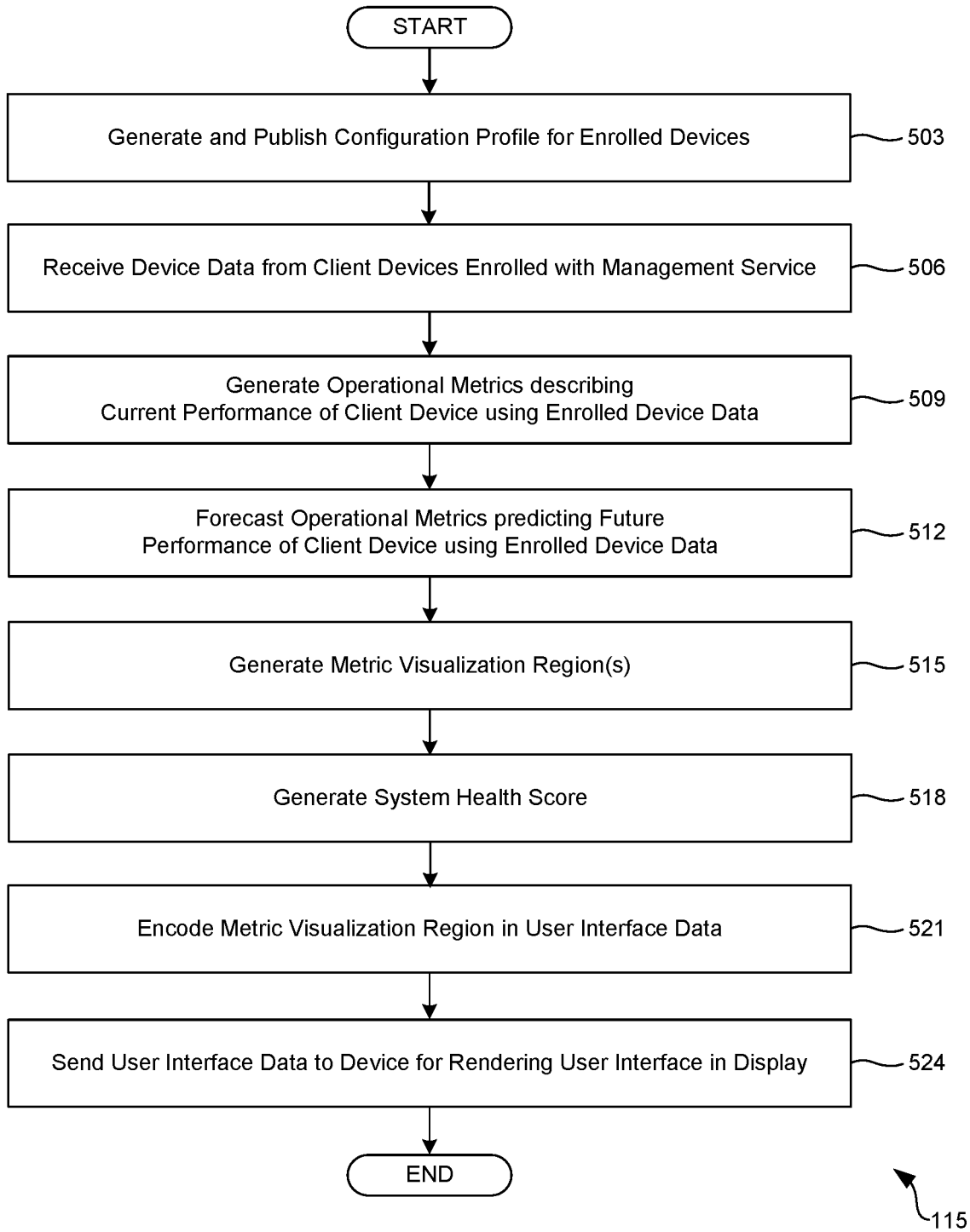
FIG. 5 is a flowchart showing an example operation of a management service according to various examples.

Referring now to FIG. 5, a flowchart is shown that provides one example operation of the management service 115 or the device data evaluation service 118 according to various examples. The flowchart of FIG. 5 can be viewed as depicting an example of elements of a method implemented by the computing environment 103 executing in the networked environment 100 according to one or more examples. The separation or segmentation of functionality as discussed herein is presented for illustrative purposes only.

Beginning with step 503, the management service 115 can generate and publish a configuration profile 133 for client devices 106 enrolled with the management service 115. For instance, the administrator console 121 can include one or more user interfaces 169 that permit an administrator to provide various settings and specify various policies to oversee operation and configuration of client devices 106 enrolled with the management service 115. Based on the configurations specified by an administrator in the administrator console 121, the management service 115 can generate a configuration profile 133 that can be sent to or retrieved by the client devices 106 for local configuration and enforcement.

In some examples, the configuration profile 133 can include an XML document or similar file that directs an agent application 124 on a client device 106 to configure the client device 106 in accordance with settings or other parameters. Additionally, the configuration profile 133 can include specifications of particular data for the agent application 124 to collect.

Thus, in step 506, the management service 115 can receive enrolled device data 127 from the client devices 106 enrolled with the management service 115. In some examples, the management service 115 or the agent application 124 can instruct the client device 106 to check-in with the management service 115 periodically, randomly, or based on a check-in schedule by sending enrolled device data 127 to the computing environment 103. Further, in some examples, the enrolled device data 127 can include data pertaining to the configuration or operation of the client device 106.

For instance, the enrolled device data 127 can include a device profile that includes hardware or software settings of the client device 106. Hardware settings can include user-specified configurations and other data pertaining to a display 136, camera, speaker, touch screen display, GPS or other geo-location functions, or other hardware of the client device 106. Software settings can include user-specified configurations or other data pertaining to an operating system 172, client applications 130, or other software of the client device 106. For instance, software settings can include a list of installed client applications 130, as well as various user-specified configurations or settings of the installed client applications 130. The enrolled device data 127 can include an XML file, data structure, or other data object comprising data that can be sent over the network 109.

Next, in step 509, the management service 115 can generate one or more operational metrics 148 using the enrolled device data 127 received that describe operation of the client devices 106. Generally, operational metrics 148 can include metrics derived from enrolled device data 127 that describe operation of the client devices 106 enrolled with the management service 115. In some examples, the management service 115 can generate operational metrics 148 for a single one of the client devices 106. In other examples, operational metrics 148 can be generated for client devices 106 associated with particular user groups.

In some examples, operational metrics 148 can include a number of devices having a security vulnerability identified by the management service 115. Security vulnerabilities can include the presence of one or more non-approved client applications 130, side-loaded client applications 130, or client applications 130 on a blacklist. A side-loaded client application 130 can include a client application 130 installed on a client device 106 by means other than an approved application store or other source. For instance, the agent application 124 can detect the installation of a client application 130 downloaded from a website or installed through a universal serial bus (USB) device. Further, security vulnerabilities can include the management service 115 identifying a virus or malware on a client device 106 that subjects the client device 106 to the risk of unauthorized access to enterprise data. Security vulnerabilities can further include the lack of an up-to-date security patch or the presence of an out-of-data application, such as an anti-malware application or an anti-virus application.

In further examples, operational metrics 148 can describe performance anomalies in client applications 130. For instance, a first operational metric 148 can describe an average time to perform a predetermined task in a particular client application 130. A second operational metric 148 can describe an actual time to perform the predetermined task spent by one or more users enrolled with the management service 115. As such, a comparison can be made between the first operational metric 148 and the second operational metric 148 to determine whether an action needs to be performed to reduce the actual time required to perform the predetermined task. In one example, if a task includes downloading a file from an enterprise server, the action performed to improve the time taken to download the file can include analyzing settings of the enterprise server or the client device 106 to identify settings that can be optimized such that the enterprise file can be faster accessed.

In step 512, the management service 115 can forecast operational metrics 148 for a future period of time that can be used by the management service 115 in generating a visualization region 203. For instance, the management service 115 can predict future values of the operational metrics 148 as a function of historic device data 145 or other data. The management service 115 can use the forecasted ones of the operational metrics 148 to generate a trend line or otherwise show an administrator whether an operational metric 148 is trending upwards or downwards.

Based on the operational metrics 148 determined and forecasted in steps 509 and 512, the administrators of the management service 115 can determine whether to create new policies, modify existing policies, or perform a predefined task. For instance, if an operational metric 148 indicates that a subset of the client devices 106 enrolled with the management service 115 are unable to access email data from an email service through a client application 130, the administrator can attempt to restart or otherwise repair the email server. To assist with the presentation of the operational metrics 148, in step 515, the management service 115 can generate one or more metric visualization regions 203 that can be included, for example, in a region of a user interface 169 for display in an administrator console 121. As shown in the user interface 169 of FIG. 2, the management service 115 can generate one or more visualization regions 203 to describe whether a number of security vulnerabilities detected on client devices 106 enrolled with the management service 115 are increasing or decreasing based on a comparison of operational metrics 148 generated today and operational metrics 148 generated yesterday. Further, the management service 115 can generate visualization regions 203 to describe whether engagement time with a client application 130 or other service is increasing or decreasing over time.

Referring back to FIG. 5, the metric visualization regions 203 can include various visual indicators that provide an administrator with information regarding any notable changes to the client devices 106 enrolled with the management service 115, such as those that may require attention of the administrators or otherwise useful for specifying policies. The visual indicators can include, for example, a graph 206 that plots operational metrics 148 over a period of time and/or one or more circles 224, 227 having a predefined width circumscribing the graph 206 and/or an operational metric, and an operational metric 148 encapsulated within the first circle 224 and/or the second circle 227. In additional examples, the metric visualization regions 203 can include arrows 230 or other similar visual indicators that show whether an operational metric 148 has increased or decreased over a predefined period of time. The circles 224, 228, in some examples, can represent a population of client devices 106 in a user group, such as a population of client devices 106 having Apple® iOS or client devices 106 having the Android® operating system. Alternatively, the circles 224 can represent an entirety of the client devices 106 enrolled with the management service 224.

The management service 115 can generate the circle 224, 227 such that a portion of the circle 224, 227 is filled, shaded, populated, or sized based on an operational metric 148 or a change in the operational metric 148 associated therewith. For instance, in some examples, if an operational metric 148 increases 80% over a predefined period of time, the management service 115 can generate the circle 224, 227 such that 80% of the circle 224, 227 is shown filled or shaded. In other examples, if an operational metric 148 indicates that 25% of client devices 106 are associated with an operational metric 148, such as 25% of the client devices 106 in a user group being infected with malware, the management service 115 can generate the circle 224, 227 such that 25% of the circle 224, 227 is shown filled or shaded. Alternatively, if the operational metric 148 indicates that 25% of the client devices 106 in the user group are infected with malware, the management service 115 can generate the circle 224, 227 such that 75% of the circle 224, 227 is shown filled, denoting that 75% of the client devices 106 are free of infection.

The metric visualization region 203 can further include an upper bound 218 and/or a lower bound 221. In some examples, the management service 115 can determine the upper bound 218 as a maximum value in a set of operational metrics 148 and the lower bound 221 as a minimum value in the set of operational metrics 148. Alternatively, in some examples, the upper bound 218 and/or the lower bound 221 can include predefined thresholds specified by the administrator. In any event, in some examples, the upper bound 218 can include a line or other visual indicator that, for a set of operational metrics 148, is larger than every operational metric 148 in the set. Similarly, the lower bound 218 can include a line or other visual indicator that, for a set of operational metrics 148, is less than every operational metric 148 in the set.

In step 518, the management service 115 can generate a system health score 233. In some examples, the management service 115 can generate the system health score 233 as a function of the operational metrics 148 or the forecasted operational metrics 148 determined in steps 509 and 512. In some examples, the management service 115 can generate the system health score as a weighted summation using the following equation:

$$\text{system\_health\_score} = \sum_{i=1}^{n} w_i m_i, \text{for } i=1,2,3,\ldots,n \quad \text{(eq. 1)},$$

where $m_i$ represents an operational metric 148 for a particular factor, $w_i$ represents a weight assigned to the particular factor, and "system_health_score" represents a system health score 233 calculated as a summation of weighted operational metrics 148 determined for various factors. The operational metrics 148, m, can include, for example, a percentage of the client devices 106 having a security vulnerability, a metric describing engagement with the agent application 124 or other client application 130, as well as other information as can be appreciated.

Based on the system health score 233 or the operational metrics 148, the management service 115 can determine and display insights 236 in the user interface 169. For instance, the insights 236 can include recommendations for an administrator to implement to improve one or more of the operational metrics 148. In some examples, the management service 115 can identify a weighted operational metric 148 used in eq. 1 that causes the system health score 233 to reduce significantly as opposed to other weighted operational metrics 148. For instance, the management service 115 can assign a higher weight to a percentage of the client devices 106 having a security vulnerability as opposed to a weight assigned to a percentage of the client devices 106 without a software license. If a high percentage of the client devices 106 have a security vulnerability, and based on the higher weight assigned to the security vulnerability factor, the management service 115 can determine that the system health score 133 is being reduced in large parte due to the presence of security vulnerabilities on the client devices 106. Accordingly, the management service 115 can generate one or more insights 236 that include a suggestion for a setting that, if enabled, improves the operational metrics 148 and/or the system health score 233.

Thereafter, in step 521, the management service 115 can encode the one or more metric visualization regions 203 in user interface data for generating a user interface 169 on a display 175. In some examples, the user interface data can include hypertext markup language (HTML) code. In other examples, the user interface data can include a JSON or XML data object sent to a client device 106 for use in presenting data in the display 175.

In step 524, the management service 115 can send user interface data to a device associated with an administrator for rendering the user interface 169 in the display 175. In some examples, an administrator, such as an IT person employed by an enterprise or other organization, can access the user interface 169 through an administrator console 121. The management service 115 can serve up the administrator console 121 through a web browser application in the form of a network page, or through a dedicated screen of a client application 130. Through the administrator console 121, the administrator can improve the overall performance of the system through interactions with the operational metrics 148 and the visualization regions 203. Thereafter, the process can proceed to completion.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 130 and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 136 upon which a user interface 169 generated by the client application 130 or another application can be rendered. In some examples, the user interface 169 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application 130, the agent application 124, and other various systems described herein can be embodied in software or code executed by general-purpose hardware as discussed above, as an alternative the same can also be embodied in dedicated hardware or a combination of software/general-purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code stored and accessible from memory that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program instructions, program code, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device comprising at least one hardware processor; and
   program instructions stored in memory and executable in the at least one computing device that, when executed, direct the at least one computing device to:
     receive device data from a plurality of client devices enrolled with a management service configured to remotely oversee operation of the client devices;
     generate a plurality of operational metrics using the device data describing operation of the client devices;
     generate a system health score describing operation of the client devices enrolled with the management service as a function of the operational metrics;
     generate a first metric visualization region that comprises the system health score, wherein the first metric visualization region further comprises a metric value and a first icon corresponding to the metric value that describe an increase or a decrease in the health score;
     generate a second metric visualization region that comprises a first circle and a second circle, each having a predefined width, circumscribing a first respective one of the operational metrics and a second icon that describes an increase or a decrease in corresponding ones of the operational metrics over time, wherein a portion of the first circle is filled based on a value of a first subset of the operational metrics corresponding to a first period of time and a portion of the second circle is filled based on a value of a second subset of the operational metrics corresponding to a second period of time, the second period of time being different than the first period of time;
     generate a third metric visualization region that comprises a third circle circumscribing a second respective one of the operational metrics and a third icon that describes an increase or a decrease in corresponding ones of the operational metrics over time, wherein a portion of the third circle is filled based on a value of a third subset of the operational metrics corresponding to a third period of time;
     generate a fourth metric visualization region that comprises a fourth circle circumscribing a third respective one of the operational metrics and a graph that plots a fourth subset of the operational metrics over time and forecasting metrics generated for a future period of time as a function of the fourth subset of the operational metrics, wherein a portion of the fourth circle is filled based on a value of the fourth subset of the operational metrics corresponding to a fourth period of time;
     generate a suggested predefined action for an administrator to implement to improve at least one of the plurality of operational metrics and the system health score; and
     generate at least one user interface that comprises the first metric visualization region, the second metric visualization region, the third metric visualization region, and the suggested predefined action for transmission to an administrator device for display in association with the management service.

2. The system of claim 1, wherein the third metric visualization region further comprises a graph that plots the third subset of the operational metrics over a predefined period of time, the graph being positioned within the third circle.

3. The system of claim 2, wherein:
   the at least one computing device is further directed to generate forecasted metrics for a future period of time, the forecasted metrics determined based at least in part on the third subset of the operational metrics; and
   the graph of the metric visualization region is generated to comprise a line plot of the forecasted metrics shown as a continuation of the graph.

4. The system of claim 2, wherein the graph as generated further comprises a visual indicator positioned on the graph for one of the third subset of the operational metrics corresponding to a current time period.

5. The system of claim 2, wherein the graph as generated further comprises an upper bound and a lower bound, the upper bound and the lower bound being determined based at least in part on the third subset of the operational metrics.

6. The system of claim 2, wherein the first metric visualization region further comprises a fourth circle circumscribing the first circle and the second circle.

7. The system of claim 6, wherein the first circle is associated with a first type of the operational metrics, the second circle is associated with a second type of the operational metrics, the third circle is associated with a third type of the operational metrics, and the fourth circle is associated with a fourth type of the operational metrics.

8. A non-transitory computer-readable medium embodying program instructions executable in at least one computing device that, when executed by the at least one computing device, direct the at least one computing device to:

receive device data from a plurality of client devices enrolled with a management service configured to remotely oversee operation of the client devices;

generate a plurality of operational metrics using the device data describing operation of the client devices;

generate a system health score describing operation of the client devices enrolled with the management service as a function of the operational metrics;

generate a first metric visualization region that comprises the system health score, wherein the first metric visualization region further comprises a metric value and a first icon corresponding to the metric value that describe an increase or a decrease in the health score;

generate a second metric visualization region that comprises a first circle and a second circle, each having a predefined width, circumscribing a first respective one of the operational metrics and a second icon that describes an increase or a decrease in corresponding ones of the operational metrics over time, wherein a portion of the first circle is filled based on a value of a first subset of the operational metrics corresponding to a first period of time and a portion of the second circle is filled based on a value of a second subset of the operational metrics corresponding to a second period of time, the second period of time being different than the first period of time;

generate a third metric visualization region that comprises a third circle circumscribing a second respective one of the operational metrics and a third icon that describes an increase or a decrease in corresponding ones of the operational metrics over time, wherein a portion of the third circle is filled based on a value of a third subset of the operational metrics corresponding to a third period of time;

generate a fourth metric visualization region that comprises a fourth circle circumscribing a third respective one of the operational metrics and a graph that plots a fourth subset of the operational metrics over time and forecasting metrics generated for a future period of time as a function of the fourth subset of the operational metrics, wherein a portion of the fourth circle is filled based on a value of the fourth subset of the operational metrics corresponding to a fourth period of time;

generate a suggested predefined action for an administrator to implement to improve at least one of the plurality of operational metrics and the system health score; and generate at least one user interface that comprises the first metric visualization region, the second metric visualization region, the third metric visualization region, and the suggested predefined action for transmission to an administrator device for display in association with the management service.

9. The non-transitory computer-readable medium of claim 8, wherein the third metric visualization region further comprises a graph that plots the third subset of the operational metrics over a predefined period of time, the graph being positioned within the third circle.

10. The non-transitory computer-readable medium of claim 9, wherein:

the at least one computing device is further directed to generate forecasted metrics for a future period of time, the forecasted metrics determined based at least in part on the third subset of the operational metrics; and the graph of the metric visualization region is generated to comprise a line plot of the forecasted metrics shown as a continuation of the graph.

11. The non-transitory computer-readable medium of claim 9, wherein the graph as generated further comprises a visual indicator positioned on the graph for one of the subset of the operational metrics corresponding to a current time period.

12. The non-transitory computer-readable medium of claim 9, wherein the graph as generated further comprises an upper bound and a lower bound, the upper bound and the lower bound being determined based on the third subset of the operational metrics.

13. The non-transitory computer-readable medium of claim 9, wherein the metric visualization region further comprises a fourth circle circumscribing the first circle and the second circle.

14. The non-transitory computer-readable medium of claim 13, wherein the first circle is associated with a first type of the operational metrics, the second circle is associated with a second type of the operational metrics, the third circle is associated with a third type of the operational metrics, and the fourth circle is associated with a fourth type of the operational metrics.

15. A computer-implemented method, comprising:

receiving device data from a plurality of client devices enrolled with a management service configured to remotely oversee operation of the client devices;

determining a plurality of operational metrics using the device data describing operation of the client devices;

generating a system health score describing operation of the client devices enrolled with the management service as a function of the operational metrics;

generating a first metric visualization region that comprises the system health score, wherein the first metric visualization region further comprises a metric value and a first icon corresponding to the metric value that describe an increase or a decrease in the health score;

generating a second metric visualization region that comprises a first circle and a second circle, each having a predefined width, circumscribing a first respective one of the operational metrics and a second icon that describes an increase or a decrease in corresponding ones of the operational metrics over time, wherein a portion of the first circle is filled based on a value of a first subset of the operational metrics corresponding to a first period of time and a portion of the second circle is filled based on a value of a second subset of the operational metrics corresponding to a second period of time, the second period of time being different than the first period of time;

generating a third metric visualization region that comprises a third circle circumscribing a second respective one of the operational metrics and a third icon that describes an increase or a decrease in corresponding ones of the operational metrics over time, wherein a portion of the third circle is filled based on a value of a third subset of the operational metrics corresponding to a third period of time;

generating a fourth metric visualization region that comprises a fourth circle circumscribing a third respective one of the operational metrics and a graph that plots a fourth subset of the operational metrics over time and forecasting metrics generated for a future period of time as a function of the fourth subset of the operational metrics, wherein a portion of the fourth circle is filled based on a value of the fourth subset of the operational metrics corresponding to a fourth period of time;

generating a suggested predefined action for an administrator to implement to improve at least one of the plurality of operational metrics and the system health score; and generating at least one user interface that comprises the first metric visualization region, the second metric visualization region, the third metric visualization region, and the suggested predefined action for transmission to an administrator device for display in association with the management service.

16. The computer-implemented method of claim 15, wherein the third metric visualization region further comprises a graph that plots the third subset of the operational metrics over a predefined period of time, the graph being positioned within the third circle.

17. The computer-implemented method of claim 16, further comprising:
determining forecasted metrics for a future period of time, the forecasted metrics determined based at least in part on the third subset of the operational metrics; and
wherein the graph of the metric visualization region is generated to comprise a line plot of the forecasted metrics shown as a continuation of the graph.

18. The computer-implemented method of claim 17, wherein the graph as generated further comprises a visual indicator positioned on the graph for one of the third subset of the operational metrics corresponding to a current time period.

19. The computer-implemented method of claim 18, wherein the graph as generated further comprises an upper bound and a lower bound, the upper bound and the lower bound being determined based on the operational metrics.

20. The computer-implemented method of claim 15, further comprising:
generating a first plurality of forecasted metrics for a future period of time, the first plurality of forecasted metrics being determined based at least in part on the operational metrics corresponding to the third metric visualization region;
generating a first graph that plots the operational metrics over a predefined period of time, the first graph being positioned within the third circle of the third metric visualization region in the at least one user interface and generated to comprise a line plot of the first plurality of forecasted metrics shown as a continuation of the first graph;
generating a fifth metric visualization that comprises a fifth circle circumscribing a third respective one of the operational metrics and a fourth icon that describes an increase or a decrease in corresponding ones of the operational metrics over time, wherein a portion of the fifth circle is filled based on a value of a fourth subset of the operational metrics corresponding to a fifth period of time;
generating a second plurality of forecasted metrics for the future period of time, the second plurality of forecasted metrics being determined based at least in part on the operational metrics corresponding to the fourth metric visualization region; and
generating a second graph that plots the operational metrics over a predefined period of time, the second graph being positioned within the fifth circle of the fifth visualization region in the at least one user interface and generated to comprise a line plot of the second plurality of forecasted metrics shown as a continuation of the second graph;
wherein the at least one user interface as generated further comprises the fifth metric visualization region.

* * * * *